United States Patent
Poirot-Crouvezier

(10) Patent No.: US 12,203,181 B2
(45) Date of Patent: Jan. 21, 2025

(54) BIPOLAR PLATE FOR AN ELECTROCHEMICAL REACTOR

(71) Applicant: COMMISSARIAT A L'ENERGIE ATOMIQUE ET AUX ENERGIES ALTERNATIVES, Paris (FR)

(72) Inventor: Jean-Philippe Poirot-Crouvezier, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 526 days.

(21) Appl. No.: 17/534,723

(22) Filed: Nov. 24, 2021

(65) Prior Publication Data

US 2022/0162763 A1 May 26, 2022

(30) Foreign Application Priority Data

Nov. 26, 2020 (FR) ..................... 2012184

(51) Int. Cl.
- *C25B 11/036* (2021.01)
- *C25B 1/04* (2021.01)
- *C25B 13/00* (2006.01)
- *H01M 8/0612* (2016.01)
- *H01M 8/0656* (2016.01)
- *H01M 8/1004* (2016.01)

(52) U.S. Cl.
CPC ............ *C25B 11/036* (2021.01); *C25B 1/04* (2013.01); *C25B 13/00* (2013.01); *H01M 8/0631* (2013.01); *H01M 8/0656* (2013.01); *H01M 8/1004* (2013.01)

(58) Field of Classification Search
None
See application file for complete search history.

(56) References Cited

U.S. PATENT DOCUMENTS 10,062,912 B2 * 8/2018 Poirot-Crouvezier ...................... H01M 8/0254
11,811,104 B2 * 11/2023 Guimard ............ H01M 8/1004
(Continued)

FOREIGN PATENT DOCUMENTS

| CN | 110061260 A | 7/2019 |
| CN | 110380073 A | 10/2019 |

(Continued)

OTHER PUBLICATIONS

Machine translation of SU et al CN-113823809-A (Year: 2021).*
(Continued)

*Primary Examiner* — Harry D Wilkins, III
(74) *Attorney, Agent, or Firm* — Oliff PLC

(57) ABSTRACT

A bipolar plate for an electrochemical reactor, including at least one anode sheet and one cathode sheet, each having an internal face and an external face, the anode and cathode sheets being in contact with each other via their internal face, each anode and cathode sheet including, on its external face, channels for circulating reactive fluids, the channels demarcating, at the internal faces of the anode and cathode sheets, cooling pipes for a flow of a heat transfer fluid, the channels of the anode and cathode sheets including alternating bosses and indentations, the bosses of the anode sheet being arranged in a staggered manner and the bosses of the cathode sheet being arranged in a staggered manner.

15 Claims, 10 Drawing Sheets

(56) References Cited

U.S. PATENT DOCUMENTS

| | | | |
|---|---|---|---|
| 2006/0003220 A1* | 1/2006 | Sugiura | H01M 8/0273 |
| | | | 429/514 |
| 2007/0015019 A1 | 1/2007 | Baschek et al. | |
| 2011/0123887 A1 | 5/2011 | Suda | |
| 2011/0143247 A1* | 6/2011 | An | H01M 8/241 |
| | | | 429/434 |
| 2015/0311539 A1* | 10/2015 | Brandt | H01M 8/1018 |
| | | | 429/514 |
| 2017/0279131 A1 | 9/2017 | Poirot-Crouvezier | |
| 2017/0279132 A1 | 9/2017 | Poirot-Crouvezier | |
| 2021/0020959 A1* | 1/2021 | Guimard | H01M 8/04029 |

FOREIGN PATENT DOCUMENTS

| | | | | |
|---|---|---|---|---|
| CN | 110828843 A | | 2/2020 | |
| CN | 111180755 A | | 5/2020 | |
| CN | 113823809 A | * | 12/2021 | H01M 8/026 |
| EP | 3223352 A1 | | 9/2017 | |
| EP | 3621137 A1 | * | 3/2020 | H01M 8/0206 |
| FR | 3049391 A1 | | 9/2017 | |
| FR | 3079676 A1 | * | 10/2019 | H01M 8/0263 |
| WO | 2004/107486 A1 | | 12/2004 | |

OTHER PUBLICATIONS

Jul. 26, 2021 Written Opinion of the Search Report issued in French Patent Application No. 2012184.
Jul. 7, 2023 Office Action issued in Chinese Patent Application No. 202111420591.4.

\* cited by examiner

BIPOLAR PLATE FOR AN ELECTROCHEMICAL REACTOR

The present invention relates to an electrochemical reactor, in particular a fuel cell or an electrolyzer, which is formed by a stack of bipolar plates and membrane-electrode assemblies (also called MEAs). More specifically, the invention relates to a bipolar plate for an electrochemical reactor, comprising sheets providing channels for circulating reactive fluids.

TECHNICAL FIELD

This invention particularly applies to the field of fuel cells. The invention can be applied to fuel cells supplied with hydrogen as fuel, but it also can be applied to other fuels, such as methanol, for example.

A fuel cell is a stack of elementary cells, in which an electrochemical reaction occurs between two reactive fluids, the fuel and the oxidant, which are introduced continuously. The fuel is brought into contact with the anode, the oxidant is brought into contact with the cathode. The reaction is subdivided into two half-reactions, namely an oxidation and a reduction, which occur in the presence of an ionic conductor between the two electrodes, the electrolyte, and an electrical conductor, the external electrical circuit, on the one hand, at the anode/electrolyte interface and, on the other hand, at the cathode/electrolyte interface.

Each elementary cell is formed by a cell core or membrane-electrode assembly (MEA), associated with bipolar plates that distribute the reactive fluids, collect the products, transmit the produced electrical and thermal energy, and physically separate the various anode, cathode and cooling compartments, sometimes with the assistance of seals.

PRIOR ART

Patent application FR 3049391 describes a bipolar plate comprising a first and a second conductive sheet. A cooling circuit, in which a heat transfer fluid flows, is provided between the two sheets. The first conductive sheet comprises bosses arranged in channels and all aligned with each other in both directions of the plane. The second sheet comprises bosses arranged in channels and arranged in a staggered manner. With such a distribution of the bosses, in some zones of the bipolar plate, the heat transfer fluid flows through a small number of thin pipes, which causes a pressure drop in the cooling circuit. Furthermore, the various separations and recombinations of channels can generate turbulent behavior that causes pressure drops.

Therefore, a requirement exists for reducing the pressure drop in the cooling circuit without causing a pressure drop in the channels for distributing the reactive fluids.

SUMMARY OF THE INVENTION

The invention is intended to address this requirement and the aim of the invention, according to a first aspect thereof, is a bipolar plate for an electrochemical reactor, comprising at least one anode sheet and one cathode sheet, each having an internal face and an external face, the anode and cathode sheets being in contact with each other via their internal face, each anode and cathode sheet comprising, on its external face, channels for circulating reactive fluids, said channels demarcating, at the internal faces of the anode and cathode sheets, cooling pipes for a flow of a heat transfer fluid, the channels of the anode and cathode sheets comprising alternating bosses and indentations, the bosses of the anode sheet being arranged in a staggered manner and the bosses of the cathode sheet being arranged in a staggered manner.

An "anode sheet" denotes a sheet, the external face of which is intended to be in contact with an anode of the electrochemical reactor. A "cathode sheet" denotes a sheet, the external face of which is intended to be in contact with a cathode of the electrochemical reactor. The anode and cathode sheets are conductive sheets, for example, made from a metallic material, in particular metal. The anode and cathode sheets can be made from any conductive material that can be shaped. The anode and cathode sheets can be stamped sheets, the channels, bosses and indentations can be made by stamping.

Channels

A "channel" denotes a depression in an anode or cathode sheet, which particularly can extend longitudinally. It can be elongated along a longitudinal axis of the sheet. For example, it can assume the shape of a groove. Each anode or cathode sheet in particular can comprise a plurality of channels extending parallel to one another, in particular evenly. The channels of a sheet can be, for example, spaced apart from each other by a distance d, which can be constant when moving along the channel, and which can be the same for two consecutive channels of a sheet, or even for all the channels of a sheet. The distance d can be constant when moving along the channel, and can be the same for all the channels of the two anode and cathode sheets.

The "longitudinal axis X" of the bipolar plate is understood to be a general axis for the flow of reactive fluids and of the heat transfer fluid in the bipolar plate. Each channel of a sheet can substantially extend along this longitudinal axis X or along a longitudinal axis that is parallel thereto. All the channels of a sheet thus can extend along the longitudinal axis X. Preferably, the channels of the anode sheet and of the cathode sheet extend along the longitudinal axis X.

The "transverse axis Y" is understood to be an axis perpendicular to the longitudinal axis X. Thus, the longitudinal X and transverse Y axes define a median plane of the bipolar plate.

A channel can have a constant cross-section, taken perpendicular to the longitudinal axis X.

The channels can have, for example, a width e, which can be constant when moving along the channel, and which can be the same for two channels of a sheet, or even for all the channels of a sheet. The width e is measured along the transverse axis Y. The width e can be constant when moving along the channel, and can be the same for all the channels of the two anode and cathode sheets.

The channels of the anode sheet can be transversely offset in relation to the channels of the cathode sheet. Thus, when the two sheets are in contact with each other, the channels of the anode sheet cannot be superimposed on the channels of the cathode sheet.

The channels and/or the cooling pipes can have a substantially constant width along the longitudinal axis X. The cooling pipes can have a width that is substantially equal to twice the width of the channels. Thus, the cooling pipes cannot have a constriction zone that would cause a reduction in the flow of the heat transfer fluid.

Ribs

The channels can have ribs between them, which in particular can extend longitudinally. The ribs can comprise a substantially flat top, in particular on the side of the external face. The tops of the ribs can come into contact with the anode or the cathode in the electrochemical reactor. These ribs can substantially extend along the longitudinal axis X. The ribs can have a constant cross-section, taken perpendicular to the longitudinal axis X. The thickness of a rib can correspond to the distance d between two consecutive channels. The gap between two consecutive ribs can correspond to the width e of a channel.

The width e of the channels can be equal to the distance d between two channels. Alternatively, the width e of the channels can be greater than the distance d between two channels, for example, it can be double. Alternatively, the width e of the channels can be less than the distance d between two channels, for example, it can be half.

The channels of the anode sheet can be offset in relation to the channels of the cathode sheet by a distance that is equal to the distance d. Thus, the rib of one sheet inserts into the channel of the other sheet. The two sheets can be at least partially interlocked. This partial interlocking allows the spatial requirement of the bipolar plate to be reduced.

Bosses

The bosses of the anode sheet can be arranged in a staggered manner in relation to the bosses of the cathode sheet.

A "boss" denotes a zone of the channel where the depression forming the channel is smaller. These bosses form bumps when the corresponding sheet is viewed with the external face above the internal face, and form depressions when the corresponding sheet is viewed with the external face below the internal face. The height of the bosses can be less than the height of the ribs. Thus, the reactive fluids can circulate over the bosses. The bosses occupy at most 90%, preferably at most 75%, more preferably at most 60%, for example, they occupy approximately 50%, of the depth of the channels.

The bosses can partially prevent the circulation of reactive fluids in the channels. Nevertheless, the pressure drop in the circulation of the reactive fluids is acceptable for the proper functioning of the electrochemical reactor. On the contrary, they can provide cooling pipes for circulating the heat transfer fluid.

An "indentation" denotes a zone of the channel where the depression forming the channel is bigger. These indentations can have a substantially flat bottom. The indentations and the substantially flat tops of the ribs ensure good contact between the two sheets of the bipolar plate, as well as good contact between the anode or the cathode and the corresponding sheet. Within the channels, along the longitudinal axis X, the shape of the indentations can match that of the bosses, i.e. in a channel the non-indented zones are bosses and the zones without bosses are indentations.

The term "arranged in a staggered manner" means that the bosses of the anode sheet are longitudinally and transversely offset in relation to each other and that the bosses of the cathode sheet are longitudinally and transversely offset in relation to each other.

The bosses of the anode sheet also can be longitudinally and transversely offset in relation to the bosses of the cathode sheet.

The staggered arrangement of the bosses of one sheet in relation to the other enables the arrangement of the cooling pipes and thus enables a cooling circuit to be formed between the sheets. The heat transfer fluid can successively circulate from a boss of a channel of the anode sheet to a boss of a channel of the cathode sheet. As these bosses are staggered, the heat transfer fluid can thus progress along the longitudinal axis X. The heat transfer fluid can flow along an axis forming curves, in particular ripples, for example, sinusoidally, between the bosses of the two anode and cathode sheets. Alternatively, the heat transfer fluid can flow along a substantially straight, in particular straight, flow axis between the bosses of the two anode and cathode sheets.

At least one boss of the anode sheet can be in contact with at least one boss of the cathode sheet, preferably with at least two bosses, more preferably with three bosses.

At least one boss of the cathode sheet can be in contact with at least one boss of the anode sheet, preferably with at least two bosses, in particular with two bosses.

At least one boss of the anode sheet can be in contact with at least two bosses of the cathode sheet and/or at least one boss of the cathode sheet can be in contact with at least two bosses of the anode sheet.

In one embodiment, at least one boss of the anode sheet can be in contact with two bosses of the anode sheet and at least one boss of the anode sheet can be in contact with three bosses of the cathode sheet.

Over at least 75% of their total length, the bosses of the anode sheet are in contact with at least one boss of the cathode sheet, preferably over at least 90% of their total length, the bosses of the anode sheet are in contact with at least one boss of the cathode sheet, more preferably over at least 95% of their total length, the bosses of the anode sheet are in contact with at least one boss of the cathode sheet.

By virtue of these contacts between bosses of the two sheets, the heat transfer fluid can flow from one boss to another, in particular successively from a boss of a channel of the anode sheet to a boss of a channel of the cathode sheet and/or successively from a boss of a channel of the cathode sheet to a boss of a channel of the anode sheet, in order to progress in the general direction X. The cross-sectional area of the cooling pipes varies only slightly, in particular by width, in the flow direction. For example, it can be substantially of the order of a multiple of the width of a channel, in particular twice the width of a channel, being greater than the width of a channel. The flow area can vary over less than 30%, preferably less than 20%, for example, of the order of 10% of the total length of the flow. The "total length of the flow" is understood to be the distance traveled by the heat transfer fluid between its entry and exit from the cooling pipes. Therefore, there is minimal narrowing of the cooling pipes, and minimal division and/or recombination of the flow.

Each boss of the anode sheet can be in contact with at least one boss of the cathode sheet, for example, with two or three bosses of the cathode sheet. Each boss of the cathode sheet can be in contact with at least one boss of the anode sheet, for example, with two or three bosses of the anode sheet.

The contact between a boss of the anode sheet and a boss of the cathode sheet can occur on the lateral faces of the bosses, in relation to the longitudinal axis X.

The anode sheet and the cathode sheet can each comprise patterns. The patterns can be formed by a consecutive boss and indentation in the same channel. The patterns of the anode sheet can all have a first length and the patterns of the cathode sheet can all have a second length. The length of a pattern corresponds to the cumulative length of a consecutive boss and indentation.

The patterns of the anode sheet can all have a first length and the patterns of the cathode sheet can all have a second length.

The patterns of the same sheet can all have the same length, measured along a longitudinal axis. Alternatively, all the patterns of the same sheet do not have the same length. At least 50% of the patterns of the same sheet can have the same length, preferably at least 70%, preferably at least 80%, preferably at least 90%, for example, of the order of 95%.

The first length can be different from the second length. Such a difference in length allows a cooling circuit to be created, in which the flow restrictions of the cooling fluid are reduced.

By virtue of the bipolar plate according to the invention, the pressure drops in the cooling circuit can be reduced. Compared to a bipolar plate of the prior art, where a single anode or cathode sheet comprises bosses arranged in a staggered manner, a reduction of almost 40% is observed with respect to the pressure drop in the cooling circuit.

Such an arrangement of the bosses with different pattern lengths ensures that the cooling pipes exhibit minimal or no narrowing. The cooling pipes are thus wide enough to allow a good flow of the heat transfer fluid. This avoids the presence of excessively narrow cooling pipes. The width of the cooling pipes can be at least twice the width e of a channel. The bipolar plate according to the invention allows the formation of narrow pipes that reduce the flow of the heat transfer fluid to be avoided, without reducing the size of the channels for distributing reactive fluids. Such a solution thus avoids hindering the efficiency of the electro-chemical reactor.

The first length can be greater than the second length.

The length of the bosses of the anode sheet can be greater than the length of the bosses of the cathode sheet. The length of the patterns of the anode sheet can be greater than the length of the patterns of the cathode sheet.

Such a difference in length ensures that the flow of reactive fluid to the cathode sheet is greater than the flow of reactive fluid to the anode sheet. As the flow of reactive fluid can be lower to the anode than to the cathode, the selection of the lengths then allows the pressure drop in the cooling circuit to be reduced.

The length of a boss of the anode sheet can be two times or four times the length of a boss of the cathode sheet. The length of a pattern of the anode sheet can be two times or four times the length of a pattern of the cathode sheet.

The ratio of the first to the second length can be a substantially integer ratio. For example, this ratio can range between n+ε and n−ε, with n being a positive integer and ε being a real number ranging between 0 and 1. In particular, the ratio of the first to the second length can be an integer ratio. Preferably, ε is selected so as to be small, in particular close to or very close to 0, so that the offset in length between the patterns of the anode sheet and the patterns of the cathode sheet remains almost constant. If the offset remains small, this avoids increasing it as the flow proceeds, and this thus avoids a loss of contact between the bosses of the anode sheet and of the cathode sheet.

The use of an integer ratio avoids introducing a pressure drop in the flow of the heat transfer fluid and ensures contact between a boss of the anode sheet and an adjacent boss of the cathode sheet.

An integer ratio, or very close to an integer ratio, of the first to the second length allows longer anode and/or cathode sheets to be used, since the offset between the bosses of the two sheets does not increase enough to cause a loss of contact.

The ratio of the first to the second length can be an even integer ratio. When the ratio of the first to the second length is even, the general direction of flow of the heat transfer fluid can be substantially parallel, in particular parallel, to the edges of the anode and cathode sheets of the bipolar plate.

This allows the heat transfer fluid to be supplied and recovered simply by placing collectors at the ends of the anode and cathode sheets.

When the ratio of the first to the second length is odd, the direction of flow of the heat transfer fluid can be inclined by an angle of inclination α in relation to the longitudinal axis X. The angle of inclination α can range between 2 and 45°, preferably between 5 and 30°, preferably between 10 and 20°, for example, of the order of 15°. In this case, the heat transfer fluid may need to be supplied and collected via the sides of the anode and cathode sheets.

The ratio of the first to the second length can be equal to 2 or to 4, being equal to 2, for example. When the ratio of the first to the second length is equal to 2 or 4, the direction of flow can be substantially parallel to the longitudinal axis X and contact can be made between the adjacent bosses of the anode sheet and of the cathode sheet.

The length of at least one indentation of the anode sheet and/or of the cathode sheet can be less than the length of at least one boss of said sheet.

At least 70% of the indentations, preferably at least 80% of the indentations, more preferably at least 90% of the indentations, for example, all the indentations of an anode and/or cathode sheet can be shorter than the length of the bosses of said sheet.

Preferably, in the anode sheet, the length of the indentations is less than the length of the bosses. This longer length of the bosses allows more space to be provided for circulating the reactive fluid.

Preferably, the length of the bosses of the anode sheet can be greater than the length of the bosses of the cathode sheet. The length of the patterns of the anode sheet can be greater than the length of the patterns of the cathode sheet. This greater length of the bosses of the anode sheet enables consistency with the gas flow that is lower at the anode. For example, in the case of a dihydrogen-dioxygen cell, as there is only 21% oxygen in the air, the minimum flow of reagent to be injected is already more than double at the cathode compared to the anode. The progressive consumption of the reagent forces the cathode to be oversupplied in order to limit the drop in concentration. Therefore, a flow rate that is three to five times higher on the cathode side is often required. It is therefore worthwhile limiting the pressure drop on the cathode side, with shorter bosses.

The length of at least one indentation of the anode and/or cathode sheet can be equal to the length of the bosses. In a pattern, the length of the indentation is equal to the length of the boss. Preferably, in all the patterns of a sheet, the length of the indentation is equal to the length of the boss.

At least 70% of the indentations, preferably at least 80% of the indentations, more preferably at least 90% of the indentations, for example, all the indentations, can have a length that is equal to the length of the bosses.

The channels can comprise curved portions.

For example, the channels can comprise alternating straight and curved portions. The use of sheets with channels comprising curved portions allows ripples in the flow of the heat transfer fluid to be reduced. A substantially straight heat transfer fluid flow thus can be obtained. Such a flow particularly allows the pressure drop in the cooling channels to be reduced.

Preferably, the curved portions of the channels of the anode sheet can have the same curvature as the curved portions of the channels of the cathode sheet. The straight portions of the channels of the anode sheet can be parallel to the straight portions of the channels of the cathode sheet. The channels of the cathode sheet can follow the channels of the anode sheet.

The channels and/or the bosses can be obtained by stamping or hydroforming the anode and/or cathode sheets.

The advantages of these methods are that they are economical and they allow a large number of anode and/or cathode sheets to be produced quickly.

A further aim of the invention, according to another aspect thereof, is an electrochemical reactor comprising:
- a bipolar plate as describe above;
- a membrane-electrode assembly, at least one of the electrodes of which is in contact with the anode sheet or the cathode sheet of the bipolar plate.

The membrane-electrode assembly can comprise a cathode, an anode, and an electrochemical membrane disposed between the anode and the cathode. The external face of the anode sheet is intended to be in contact with an anode of the electrochemical reactor. The external face of the cathode sheet is intended to be in contact with a cathode of the electrochemical reactor.

The electrochemical reactor can be a fuel cell, for example, a hydrogen PEMFC or an alkaline SAFC or SOFC. Alternatively, the electrochemical reactor can be an electrolyzer. The invention is particularly suitable for applications operating at low temperatures, for example, below 250° C.

BRIEF DESCRIPTION OF THE DRAWINGS

The invention will be better understood upon reading the following description of non-limiting embodiments thereof, and with reference to the accompanying drawings, in which.

DETAILED DESCRIPTION

In the figures and throughout the remainder of the description, the same reference signs represent identical or similar elements.

Figure 2A:
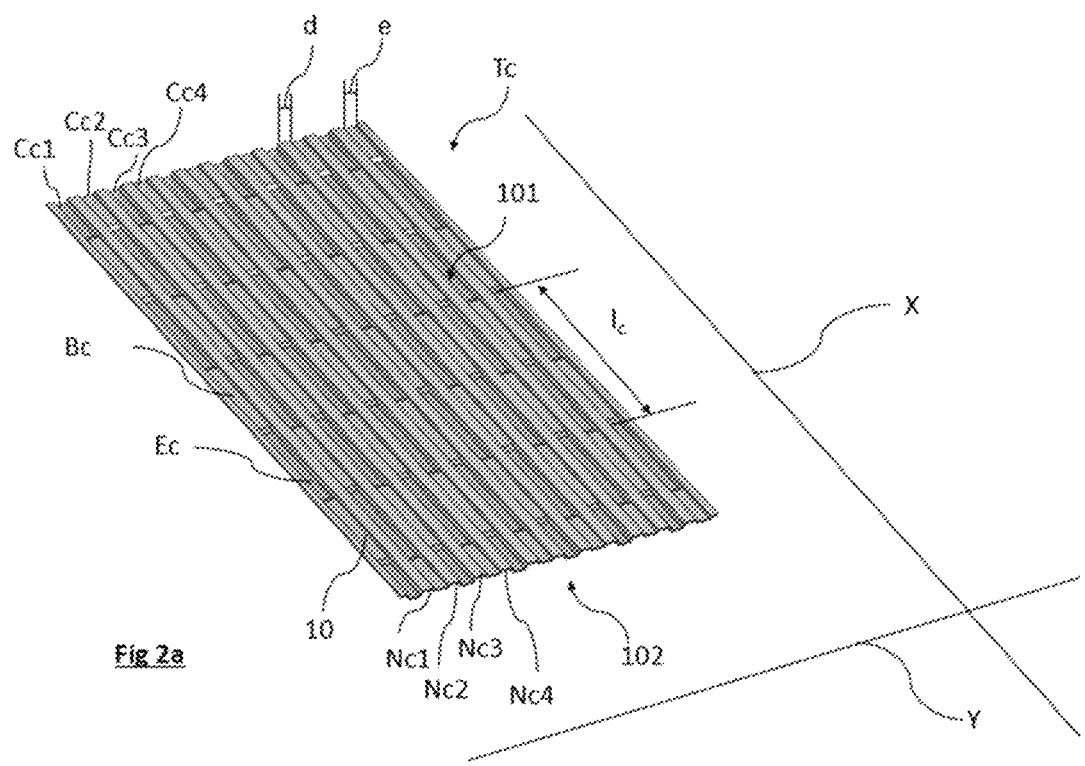
FIG. 2a is a schematic perspective view of a cathode sheet according to the invention.
Figure 2B:
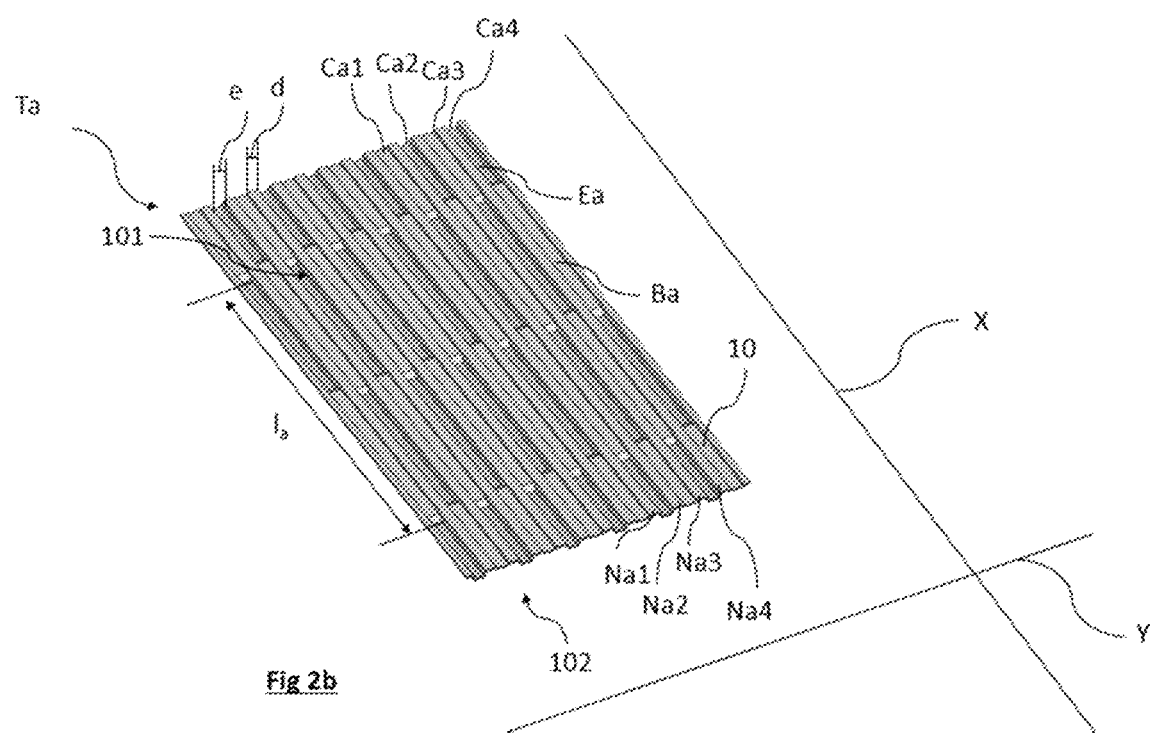
FIG. 2b is a schematic perspective view of an anode sheet according to the invention.

FIGS. 2a and 2b show an example of a cathode sheet Tc and an anode sheet Ta according to the invention. These sheets Tc, Ta each comprise an external face 101 and an internal face 102. In the case of the cathode sheet Tc, the external face 101 is intended to be in contact with a cathode of the electrochemical reactor. In the case of the anode sheet Ta, the external face 101 is intended to be in contact with an anode of the electrochemical reactor. These sheets Tc, Ta are made from a metallic material that can be shaped.

The cathode sheet Tc comprises channels Cc1, Cc2, Cc3, Cc4, which substantially extend along a longitudinal axis X and the anode sheet Ta comprises channels Ca1, Ca2, Ca3, Ca4, which substantially extend along the longitudinal axis X. All the channels Cc1, Cc2, Cc3, Cc4, Ca1, Ca2, Ca3, Ca4 have the same width e, which is substantially constant along the longitudinal axis X.

The channels Cc1, Cc2, Cc3, Cc4 together form ribs Nc1, Nc2, Nc3, Nc4. The channels Ca1, Ca2, Ca3, Ca4 together form ribs Na1, Na2, Na3, Na4. In the embodiment shown, the ribs Nc1, Nc2, Nc3, Nc4, Na1, Na2, Na3, Na4 comprise a substantially flat top 10. These ribs Nc1, Nc2, Nc3, Nc4, Na1, Na2, Na3, Na4 substantially extend along the longitudinal axis X and have a constant cross-section, taken perpendicular to the longitudinal axis X. The thickness of a rib Nc1, Nc2, Nc3, Nc4 corresponds to the distance d between two consecutive channels Cc1, Cc2, Cc3, Cc4. The thickness of a rib Na1, Na2, Na3, Na4, corresponds to the distance d between two consecutive channels Cc1, Ca1, Ca2, Ca3, Ca4. The width e of the channels is equal to the distance d between two channels.

All the channels of the two sheets Cc1, Cc2, Cc3, Cc4, Ca1, Ca2, Ca3, Ca4 comprise alternating bosses Bc, Ba and indentations Ec, Ea.

Figure 1A:
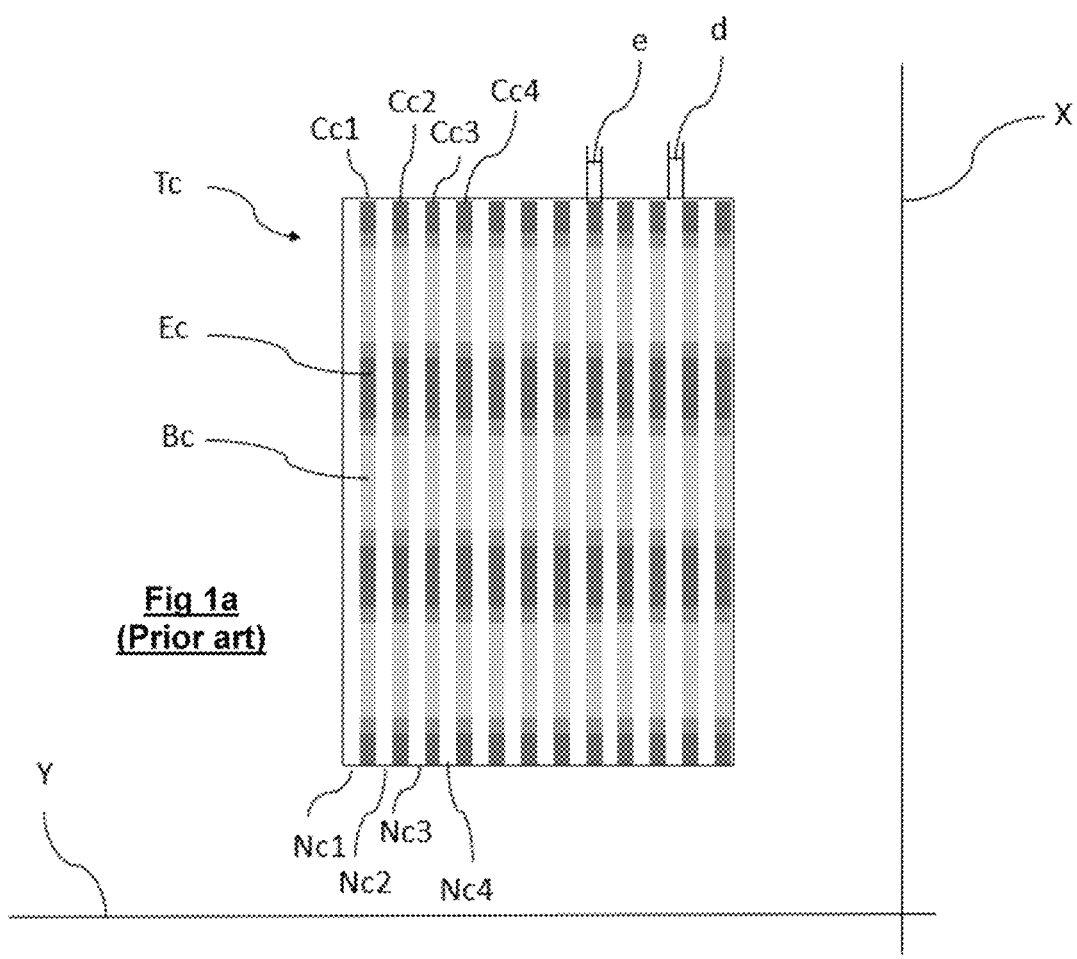
FIG. 1a is a schematic and partial top view of a cathode sheet according to the prior art.
Figure 1B:
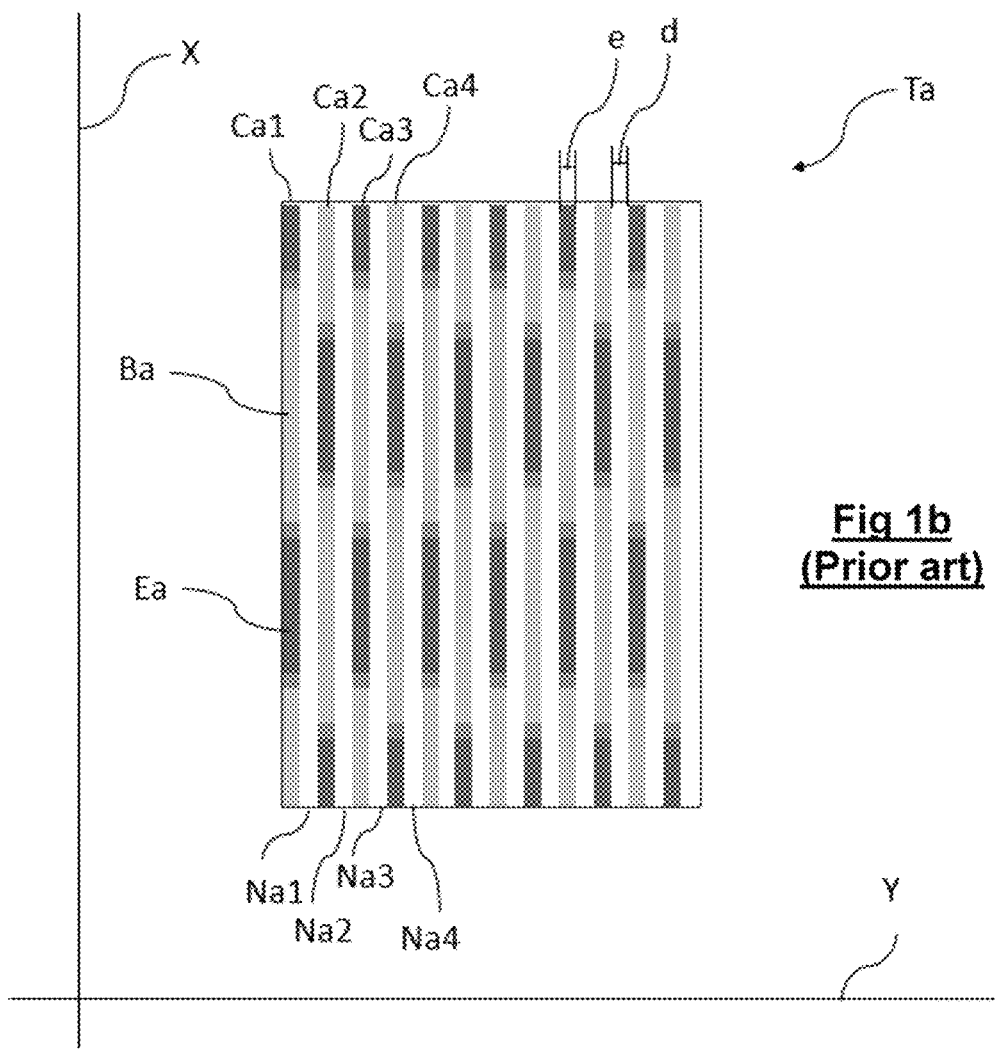
FIG. 1b is a schematic and partial top view of an anode sheet according to the prior art.
Figure 1C:
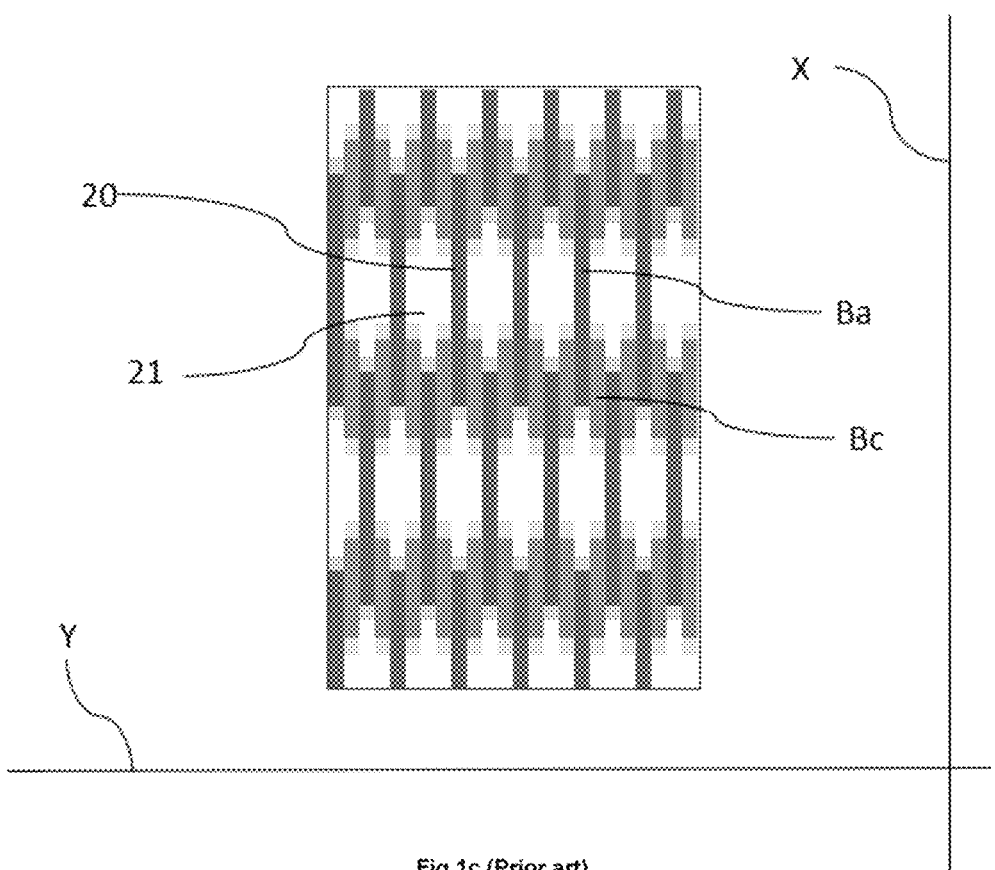
FIG. 1c is a schematic and partial top view of a cooling circuit provided between the two sheets of FIGS. 1a and 1b.

In the embodiment of the prior art, the cathode sheet Tc, which is schematically shown in FIG. 1a, comprises channels Cc1, Cc2, Cc3, Cc4, which comprise alternating bosses Bc and indentations Ec that are aligned, and the anode sheet Ta, which is schematically shown in FIG. 1b, comprises channels Ca1, Ca2, Ca3, Ca4, which comprise alternating bosses Ba and indentations Ea that are arranged in a staggered manner. The cooling circuit that is provided between these two plates is schematically shown in FIG. 1c. The heat transfer fluid flows through the pipes 20 that are formed by the series of anode Ba and cathode Bc bosses.

On the sheets according to the invention, shown in FIGS. 2a and 2b, the cathode bosses Bc and the cathode indentations Ec are arranged in a staggered manner and the anode bosses Ba and the anode indentations Ea are also arranged in a staggered manner. For example, on the cathode sheet Tc a boss in the channel Cc2 is opposite an indentation in the channel Cc1 and an indentation in the channel Cc2 when the sheet is viewed along the transverse axis Y. Similarly, on the anode sheet Ta, a boss in the channel Ca2 is opposite an indentation in the channel Ca1 and an indentation in the channel Ca2 when the sheet is viewed along the transverse axis Y. A boss in a channel therefore is at the same level as an indentation of an adjacent channel.

In order to form an electrochemical reactor according to the invention, the two sheets Ta, Tc are superimposed by stacking the anode sheet Ta on the cathode sheet Tc. The internal faces 102 of the two sheets are brought into contact. The channels Ca1, Ca2, Ca3, Ca4 of the anode sheet Ta are offset along the lateral axis Y in relation to the channels Cc1, Cc2, Cc3, Cc4 of the cathode sheet Tc by a distance d.

Thus, the channel of one sheet inserts into the rib of the other sheet. For example, the rib Nc1 inserts into the channel Ca4, the rib Nc2 inserts into the channel Ca3, the rib Nc3 inserts into the channel Ca2, the rib Nc4 inserts into the channel Ca1, and so on over the entire width of the sheets. Similarly, the rib Na1 inserts into the channel Cc4, the rib Na2 inserts into the channel Cc3, the rib Na3 inserts into the channel Cc2, the rib Na4 inserts into the channel Cc1, and so on over the entire width of the sheets. The two sheets Tc, Ta are thus partially interlocked. This partial interlocking allows the spatial requirement of the bipolar plate to be reduced.

The bosses of the anode sheet Ba can be offset along the longitudinal axis X in relation to the bosses of the cathode sheet Bc. The bosses of the anode sheet Ba are offset along the lateral axis Y in relation to the bosses of the cathode sheet Bc, since the channels Ca1, Ca2, Ca3, Ca4 of the anode sheet Ta are offset along the lateral axis Y in relation to the channels Cc1, Cc2, Cc3, Cc4 of the cathode sheet Tc. At least some of the bosses Ba of the anode sheet Ta are thus arranged in a staggered manner in relation to the bosses Bc of the cathode sheet Tc.

Figure 2C:
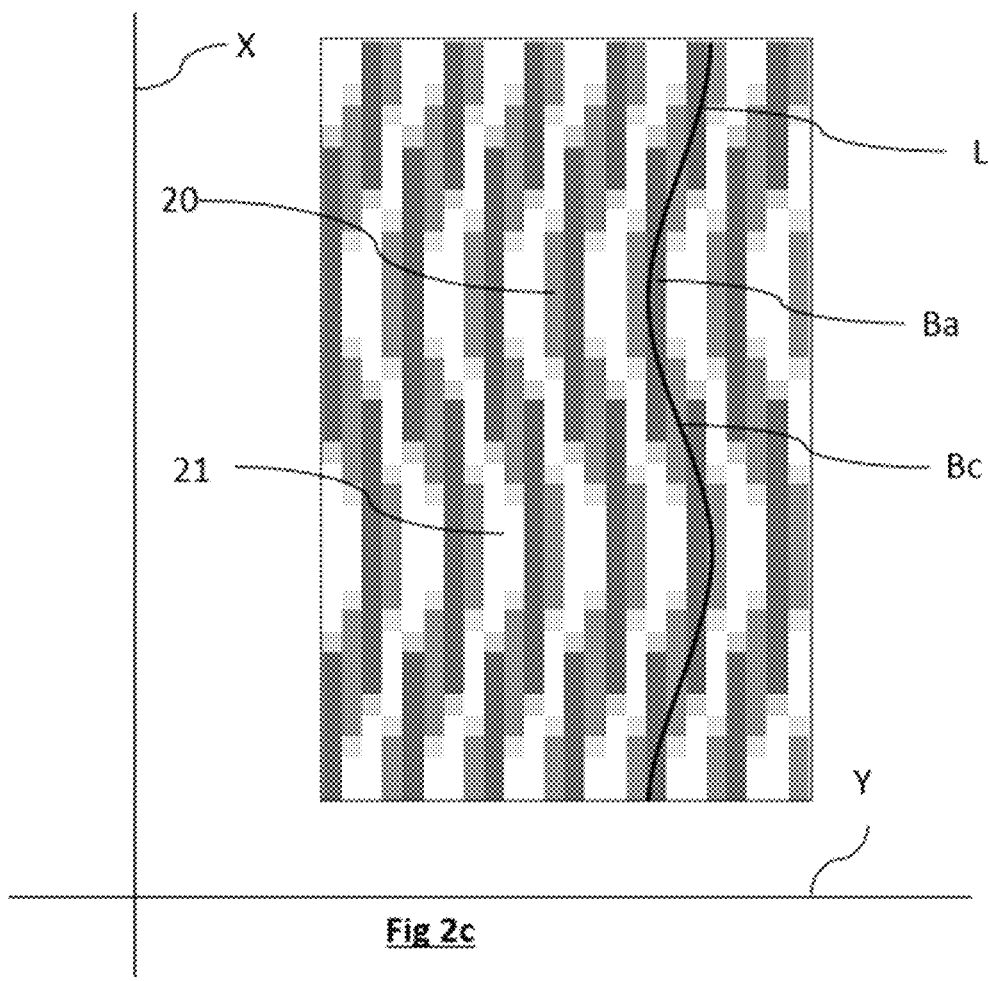
FIG. 2c is a schematic and partial top view of a cooling circuit provided between the two sheets of FIGS. 2a and 2b.

The staggered arrangement of the bosses of the anode sheet Ba in relation to the bosses of the cathode sheet Bc allows, when the two sheets are superimposed, the cooling pipes 20 shown in FIG. 2c to be provided. The zones 21 between the cooling pipes 20 are zones where the heat transfer fluid does not flow. A cooling circuit is thus formed between the sheets Ta, Tc. The heat transfer fluid successively circulates from a boss Ba of a channel Ca1, Ca2, Ca3, Ca4 of the anode sheet to a boss Bc of a channel Cc1, Cc2, Cc3, Cc4 of the cathode sheet, and then again to a boss of Ca1', Ca2'. As these bosses Ba, Bc are staggered, the heat transfer fluid can thus progress along the longitudinal axis X. The staggered arrangement of the bosses allows the heat transfer fluid to flow continuously along the longitudinal axis X, by transitioning from an anode boss to a cathode boss and vice versa. In the example shown in FIG. 2c, the heat transfer fluid flows along a line L that comprises curved portions. In this example, each boss of the anode sheet Ba is in contact with three bosses of the cathode sheet Bc.

A pattern of the anode sheet corresponds to a consecutive boss Ba and indentation Ea in the same channel. A pattern of the cathode sheet corresponds to a consecutive boss Bc and indentation Ec in the same channel. The patterns of the anode sheet are all the same length $l_a$ and the patterns of the cathode sheet are all the same length $l_c$. In the embodiment shown in FIGS. 2a, 2b, 2c, the length $l_a$ of the patterns of the anode sheet is greater than the length $l_c$ of the patterns of the cathode sheet. In this example, the ratio of the length $l_a$ of the anode patterns to the length $l_c$ of the cathode patterns is substantially equal to 2.

This difference in length, combined with the staggered arrangement of the bosses of one sheet in relation to the other, allows a cooling circuit to be created in which the restrictions of the flow of the cooling fluid are reduced. In particular, the cross-section provided for the flow of the heat transfer fluid is at least equal to the width of two channels, that is a width that is equal to 2e. In some locations, the cross-section provided for the flow of the heat transfer fluid is equal to the width of three channels, that is a width that is equal to 3e.

Figure 3A:
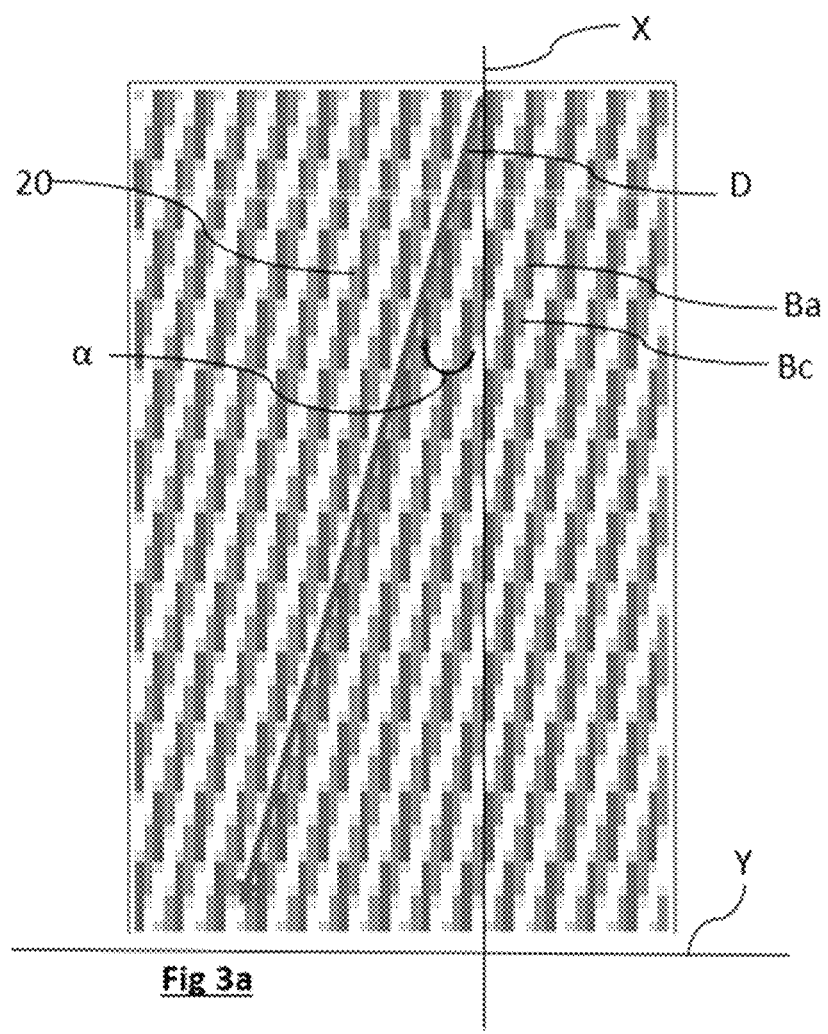
FIG. 3a is a view similar to FIG. 2c of an alternative embodiment.

FIG. 3a shows the cooling circuit obtained by superimposing an anode sheet Ta and a cathode sheet Tc, which comprise bosses arranged in a staggered manner, and for which the ratio of the lengths of the patterns is substantially equal to 1.

Figure 3B:
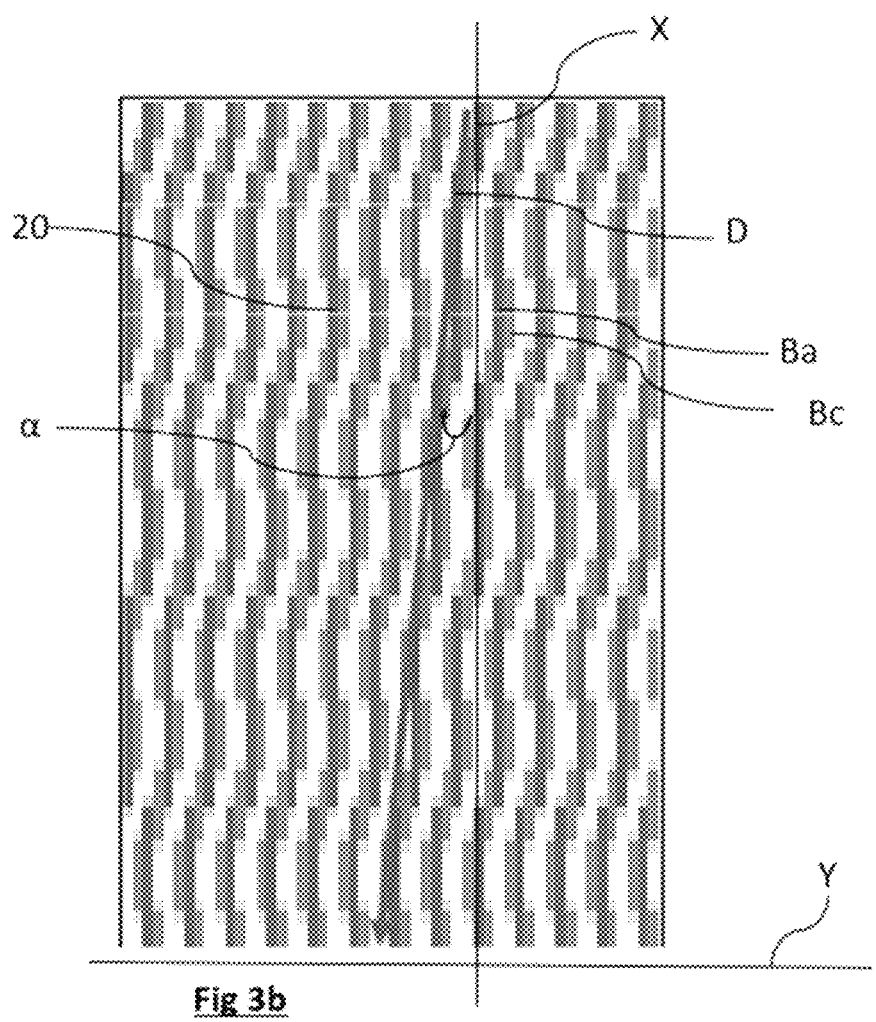
FIG. 3b is a view similar to FIG. 2c of an alternative embodiment.

FIG. 3b shows the cooling circuit obtained by superimposing an anode sheet Ta and a cathode sheet Tc, which comprise bosses arranged in a staggered manner, and for which the ratio of the lengths of the patterns is substantially equal to 3.

Figure 3C:
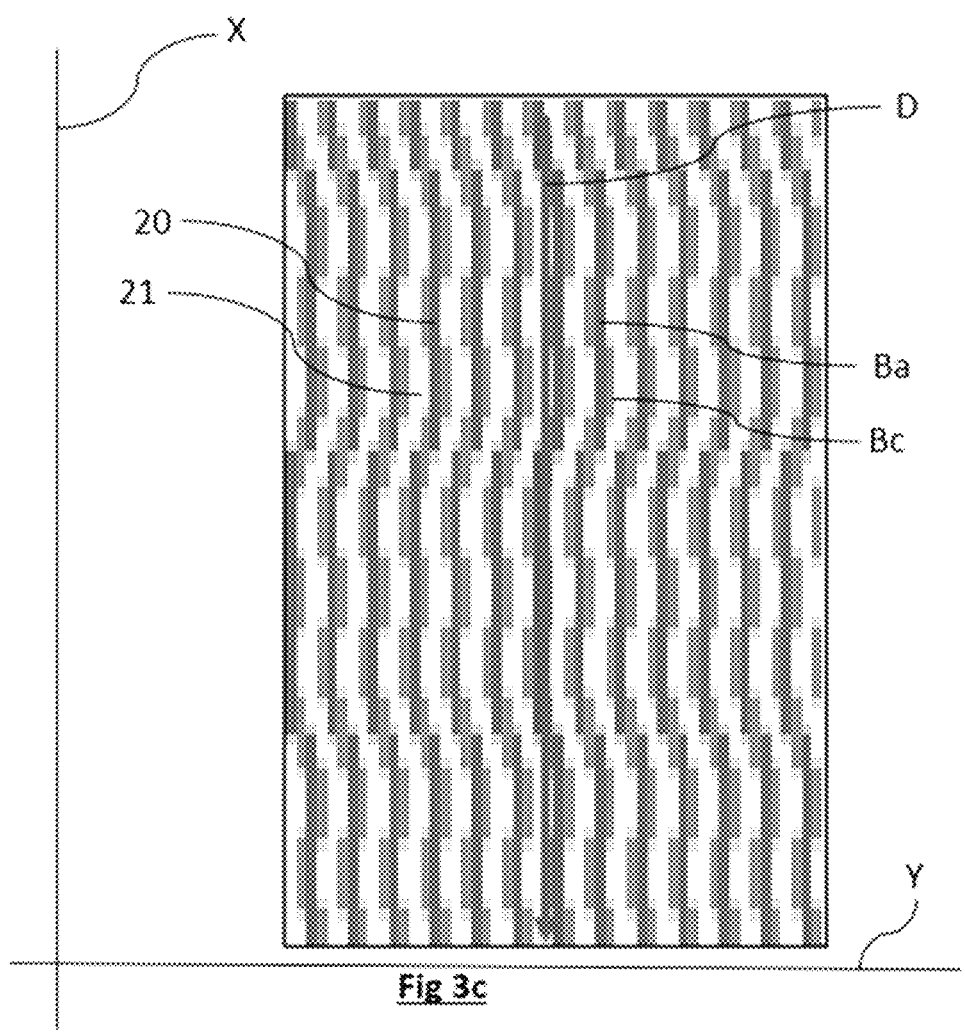
FIG. 3c is a view similar to FIG. 2c of an alternative embodiment.

FIG. 3c shows the cooling circuit obtained by superimposing an anode sheet Ta and a cathode sheet Tc, which comprise bosses arranged in a staggered manner, and for which the ratio of the lengths of the patterns is substantially equal to 4.

When the ratio of the length $l_a$ of the bosses of the anode sheet to the length $l_c$ of the bosses of the cathode sheet is odd, as shown in FIGS. 3a and 3b, the flow direction D of the heat transfer fluid is inclined by an angle of inclination $\alpha$ in relation to the longitudinal axis X. The angle of inclination $\alpha$ can range between 2 and 45°, preferably between 5 and 30°, preferably between 10 and 20°, for example, of the order of 15°. In this case, the heat transfer fluid may need to be supplied and collected through the sides of the anode and cathode sheets.

When the ratio of the length $l_a$ of the patterns of the anode sheet to the length $l_c$ of the patterns of the cathode sheet is even, as shown in FIGS. 2c and 3c, the flow direction D is substantially parallel to the longitudinal axis X.

Figure 4A:
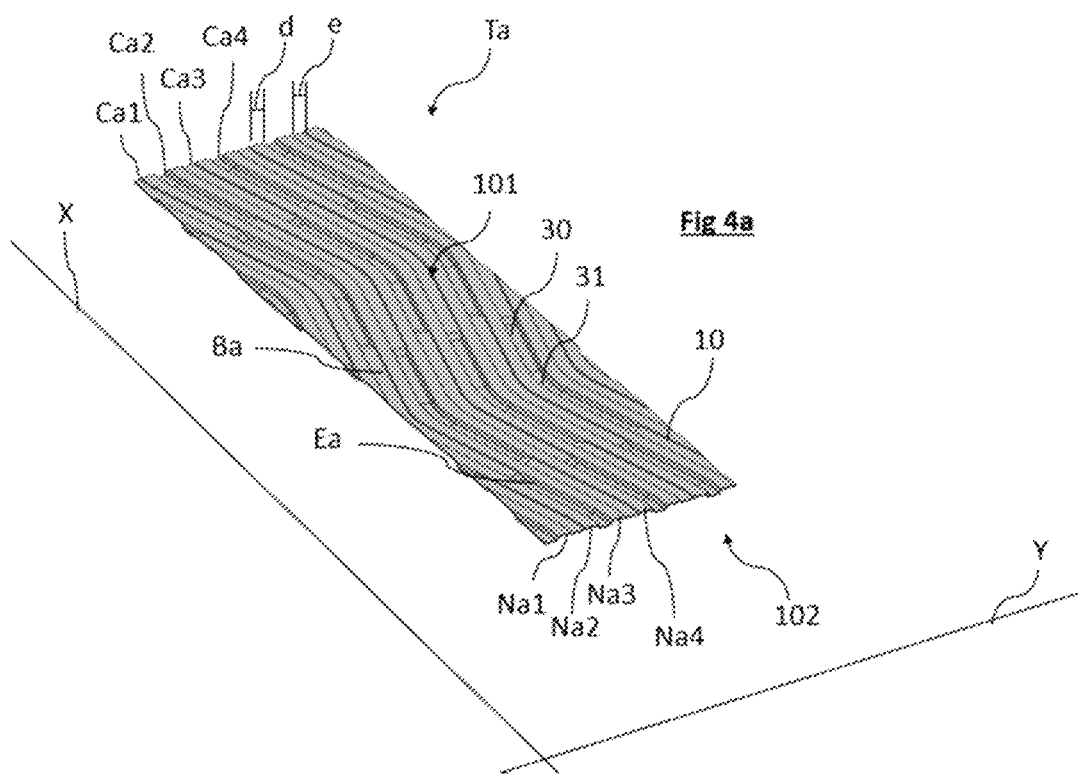
FIG. 4a is a view similar to FIG. 2b of an alternative embodiment.
Figure 4B:
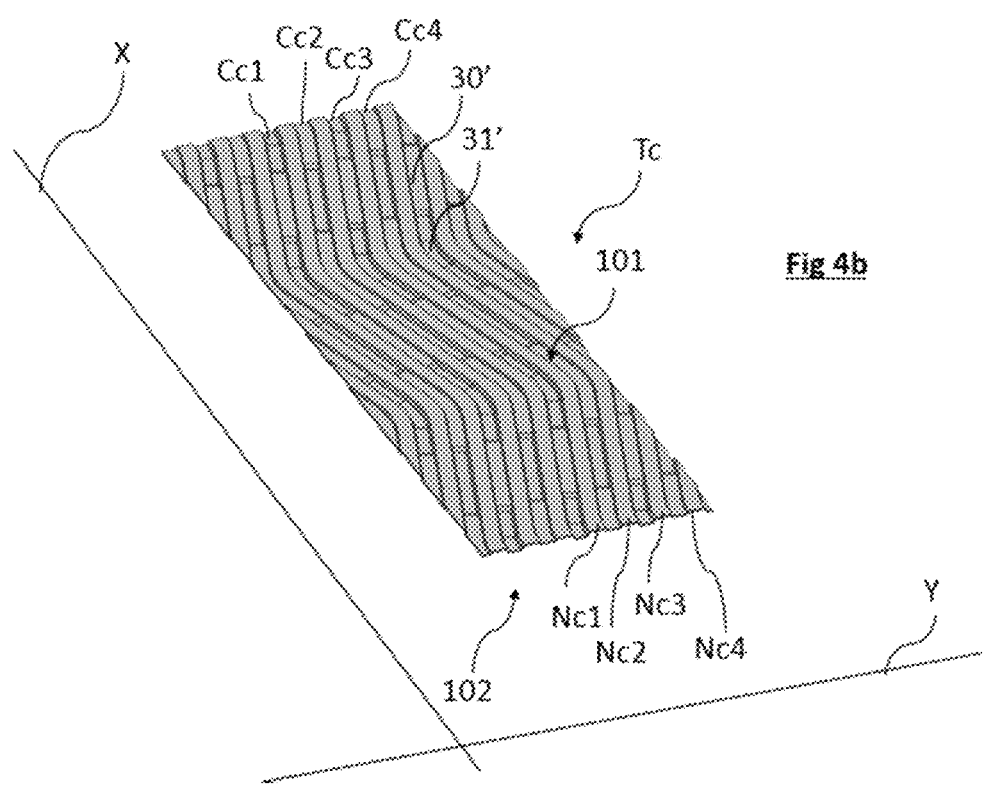
FIG. 4b is a view similar to FIG. 2a of an alternative embodiment.

FIGS. 4a and 4b show the anode Ta and cathode Tc sheets of an alternative embodiment of the invention. In this alternative embodiment, the channels Ca1, Ca2, Ca3, Ca4, Cc1, Cc2, Cc3, Cc4 do not extend along a longitudinal axis X. In this embodiment, the channels Ca1, Ca2, Ca3, Ca4 of the anode sheet Ta comprise alternating straight portions 30 and curved portions 31. Also in this embodiment, the channels Cc1, Cc2, Cc3, Cc4 of the cathode sheet Tc comprise alternating straight portions 30' and curved portions 31'. The curved portions 31 of the channels of the anode sheet Ta have the same curvature as the curved portions 31' of the channels of the cathode sheet Tc. The straight portions 30 of the channels of the anode sheet Ta are parallel to the straight portions 30' of the channels of the cathode sheet Tc. Thus, the channels of the cathode sheet Cc1, Cc2, Cc3, Cc4 follow the channels of the anode sheet Ca1, Ca2, Ca3, Ca4.

In this embodiment, the length of the anode bosses Ba is greater than the length of the cathode bosses Bc.

In the same way as in the embodiment of FIGS. 2a and 2b, in order to form an electrochemical reactor according to the invention, the two sheets Ta, Tc are superimposed by stacking the anode sheet Ta on the cathode sheet Tc and by bringing the internal faces 102 of the two sheets into contact.

Figure 4C:
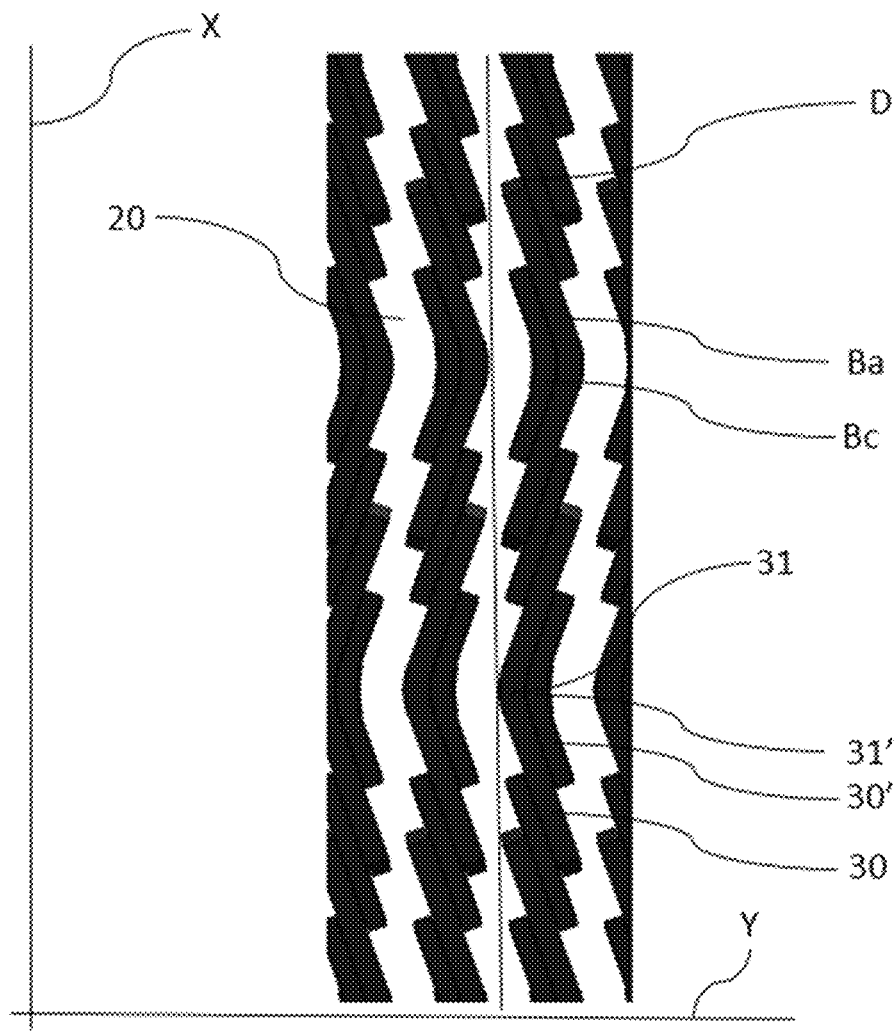
FIG. 4c is a schematic and partial top view of a cooling circuit provided between the two sheets of FIGS. 4a and 4b.

The cooling circuit provided between the anode sheet Ta of FIG. 4a and the cathode sheet Tc of FIG. 4b is shown in FIG. 4c. This cooling circuit allows a flow direction D to be obtained that substantially extends along the longitudinal axis X. Such sheets with curved portions 31, 31' allow the ripples in the flow of the heat transfer fluid to be reduced that can be present, for example, in the embodiment of FIG. 2c. Such a flow that substantially extends along the longitudinal axis X particularly allows the pressure drop in the cooling channels to be reduced further.

The invention claimed is:

1. A bipolar plate for an electrochemical reactor, comprising at least one anode sheet and one cathode sheet, each having an internal face and an external face, the anode and cathode sheets being in contact with each other via their internal face, each anode and cathode sheet comprising, on its external face, channels for circulating reactive fluids, the channels demarcating, at the internal faces of the anode and cathode sheets, cooling pipes for a flow of a heat transfer fluid, the channels of the anode and cathode sheets comprising alternating bosses and indentations, the bosses of the anode sheet being arranged in a staggered manner and the bosses of the cathode sheet being arranged in a staggered manner, and the bosses of the anode sheet being arranged in a staggered manner in relation to the bosses of the cathode sheet.

2. The bipolar plate as claimed in claim 1, at least one boss of the cathode sheet being in contact with at least one boss of the anode sheet.

3. The bipolar plate as claimed in claim 1, the anode sheet and the cathode sheet each comprising patterns formed by a consecutive boss and indentation in the same channel, the patterns of the anode sheet all having a first length and the patterns of the cathode sheet all having a second length.

4. The bipolar plate as claimed in claim 3, the first length being different from the second length.

5. The bipolar plate as claimed in claim 4, the first length being greater than the second length.

6. The bipolar plate as claimed in claim 3, the ratio of the first to the second length being a substantially integer ratio.

7. The bipolar plate as claimed in claim 6, the ratio of the first to the second length being an even integer ratio.

8. The bipolar plate as claimed in claim 7, the ratio of the first to the second length being equal to 2 or to 4.

9. The bipolar plate as claimed in claim 1, the length of at least one indentation of the anode sheet and/or of the cathode sheet being less than the length of at least one boss of the sheet.

10. The bipolar plate as claimed in claim 1, the length of at least one indentation of the anode and/or cathode sheet being equal to the length of the bosses.

11. The bipolar plate as claimed in claim 1, the channels comprising curved portions.

12. The bipolar plate as claimed in claim 11, the channels and/or the bosses being obtained by stamping or hydroforming anode and/or cathode sheets.

13. An electrochemical reactor comprising:
a bipolar plate as claimed in claim 1;
a membrane-electrode assembly comprising at least one electrode, the at least one electrode in contact with the anode sheet or the cathode sheet of the bipolar plate.

14. A bipolar plate for an electrochemical reactor, comprising at least one anode sheet and one cathode sheet, each having an internal face and an external face, the anode and cathode sheets being in contact with each other via their internal face, each anode and cathode sheet comprising, on its external face, channels for circulating reactive fluids, the channels demarcating, at the internal faces of the anode and cathode sheets, cooling pipes for a flow of a heat transfer fluid,
the channels of the anode and cathode sheets comprising alternating bosses and indentations,
the bosses of the anode sheet being arranged in a staggered manner and the bosses of the cathode sheet being arranged in a staggered manner, and
at least one boss of the anode sheet being in contact with at least one boss of the cathode sheet.

15. A bipolar plate for an electrochemical reactor, comprising at least one anode sheet and one cathode sheet, each having an internal face and an external face, the anode and cathode sheets being in contact with each other via their internal face, each anode and cathode sheet comprising, on its external face, channels for circulating reactive fluids, the channels demarcating, at the internal faces of the anode and cathode sheets, cooling pipes for a flow of a heat transfer fluid,
the channels of the anode and cathode sheets comprising alternating bosses and indentations,
the bosses of the anode sheet being arranged in a staggered manner and the bosses of the cathode sheet being arranged in a staggered manner, and
the bosses of the anode sheet being in contact with at least one boss of the cathode sheet over at least 75% of their total length.

* * * * *